United States Patent [19]

Hepner et al.

[11] Patent Number: 5,673,384
[45] Date of Patent: Sep. 30, 1997

[54] DUAL DISK LOCK ARBITRATION BETWEEN EQUAL SIZED PARTITION OF A CLUSTER

[75] Inventors: Daniel W. Hepner, Sunnyvale; Charles J. Carlino; Satya P. Mylavarabhatla, both of Santa Clara, all of Calif.

[73] Assignee: Hewlett-Packard Company, Palo Alto, Calif.

[21] Appl. No.: 540,381

[22] Filed: Oct. 6, 1995

[51] Int. Cl.$^6$ ................................................ G06F 11/00
[52] U.S. Cl. .......................... 395/182.09; 395/182.02; 395/730
[58] Field of Search .................. 395/200.05, 296, 395/290, 477, 650, 299, 728, 730, 182.09, 182.02, 182.08, 183.19

[56] References Cited

U.S. PATENT DOCUMENTS

| | | | |
|---|---|---|---|
| 4,328,542 | 5/1982 | Anastas et al. | 364/200 |
| 4,587,609 | 5/1986 | Boudreau et al. | 364/200 |
| 4,958,273 | 9/1990 | Anderson et al. | 395/182.09 |
| 5,003,464 | 3/1991 | Ely et al. | 395/182.09 |
| 5,167,022 | 11/1992 | Bahr et al. | 395/325 |
| 5,276,823 | 1/1994 | Cutts, Jr. et al. | 395/182.09 |
| 5,301,283 | 4/1994 | Thacker et al. | 395/325 |
| 5,423,044 | 6/1995 | Sutton et al. | 395/725 |
| 5,553,240 | 9/1996 | Madduri | 395/200.03 |

OTHER PUBLICATIONS

Harvey M. Deitel, *An Introduction to Operating Systems*, Revised First Edition, Addison–Wesley Publishing Company, Reading, Massachusetts, 1984, pp. 86–87.

*Primary Examiner*—Robert W. Beausoliel, Jr.
*Assistant Examiner*—Joseph E. Palys

[57] ABSTRACT

A computing system includes a first processor, a second processor, a first data storage device and a second data storage device. A first network connects the first processor to the second processor. A second network connects the first processor to the first storage device and connects the second processor to the first storage device. A third network connects the second processor to the second storage device and connects the second processor to the second storage device. The first data storage device has a first cluster quorum lock. The second data storage device has a second cluster quorum lock.

18 Claims, 3 Drawing Sheets

DUAL DISK LOCK ARBITRATION BETWEEN EQUAL SIZED PARTITION OF A CLUSTER

BACKGROUND

The present invention concerns failure recovery in a computing system and particularly relates to dual disk lock arbitration between equal sized partitions of a cluster.

In many computing environments, it is important to provide for recovery in the case of a failure somewhere in the computing system. Failure can result, for example from a power failure, component failure or a break in a communication link.

In a cluster system, there may be multiple processing sources and/or multiple data sources. Thus, upon failure in the system, operation of the system may continue by allocating the functionality of a failed entity to a another entity in the system.

For example, two central processing Units (CPUs) may communicate over a local area network (LAN). In addition, each CPU may be connected to an input/output (I/O) bus which is also connected to a common data storage device. Typically each CPU and the common data storage device will be connected to its own power circuit.

As long as the system is operating properly, one of the CPUs acts as a cluster coordinator. Access to particular data is coordinated through communication over the LAN. When a system failure results in a communication loss over the LAN, any CPU still operating needs to determine whether it should halt operation or operate as the cluster coordinator. A coordinator is needed because if more than one CPU independently utilizes the data in the common on data storage device, the data can become corrupted.

One way to determine a cluster coordinator is to use a cluster quorum lock to arbitrate between the two CPUs for access to the common data storage device. The CPU who wins the arbitration will continue to act as cluster coordinator and control operation of the common data storage device. The other CPU will halt operation until communication is re-established with the cluster coordinator.

The cluster quorum lock (CQL) is implemented, for example, using an n-process mutual exclusion algorithm such as an implementation of Dekker's algorithm or an implementation of Lamport's algorithm. See Harvey M. Deitel, *An Introduction to Operating Systems*, Revised First Edition, Addison-Wesley Publishing Company, Reading, Mass., 1984, pp. 86-87. Use of Dekker's or Lamport's algorithm will deterministically yield a mutex winner among two or more competing processors independent of any special hardware assist, such as a "test and set" functionality. The mutex winner becomes the coordinator.

However, for the cluster quorum lock to operate properly, the storage device needs to have a power circuit which is separate from the power circuit of the two CPUs. If there were only two power circuits, the disk would have to share the power circuit with one of the CPUs. The failure of the shared power circuit would leave the surviving CPU without any way to determine whether it should continue. This rules out two node configurations where there is not a storage device with separate power circuit. Thus, a typical CQL will not work for a cluster configuration consisting of two chassis, each with its own power circuit, where each chassis has its own CPU and data storage, but there is no separately powered data storage. The requirement for additional separately powered external data storage in such cases adds additional system complexity and expense.

SUMMARY OF THE INVENTION

In accordance with the preferred embodiment of the present invention, a computing system includes a first processor, a second processor, a first data storage device and a second data storage device. A first network connects the first processor to the second processor. For example, the first network is a local area network (LAN). A second network connects the first processor to the first storage device and connects the second processor to the first storage device. A third network connects the first processor to the second storage device and connects the second processor to the second storage device. The first data storage device has a first cluster quorum lock. The second data storage device has a second cluster quorum lock.

When communication between the first processor and the second processor over the first network fails, either the first processor or the second processor is selected as a coordinator, as follows: Upon the communication failure, the first processor and the second processor contend for the first cluster quorum lock. At least one of the first processor and the second processor will contend for the second cluster quorum lock. If one of the first processor or the second processor wins at least one of the first or second cluster quorum lock and does not lose either of the first or second cluster quorum lock, that processor is selected as the coordinator.

In the preferred embodiment of the present invention, the contentions are arbitrated using an n-process mutual exclusion algorithm such as Dekker's or Lamport's algorithm. Additionally, in the preferred embodiment, when the first processor loses the first cluster quorum lock, the first processor does not contend for the second cluster quorum lock. As a result of the first processor and the second processor contending for the first cluster quorum lock of the first storage device, each of the first processor and the second processor receives one of the following three responses: win, lose, or no response. Also, in the preferred embodiment, the first and second network operate in accordance with the Small Computer Systems Interface (SCSI) protocol.

The present invention allows for efficient selection of a coordinator in a two node cluster system when there is a loss of communication between node processors.

DESCRIPTION OF THE PRIOR ART

Figure 1:
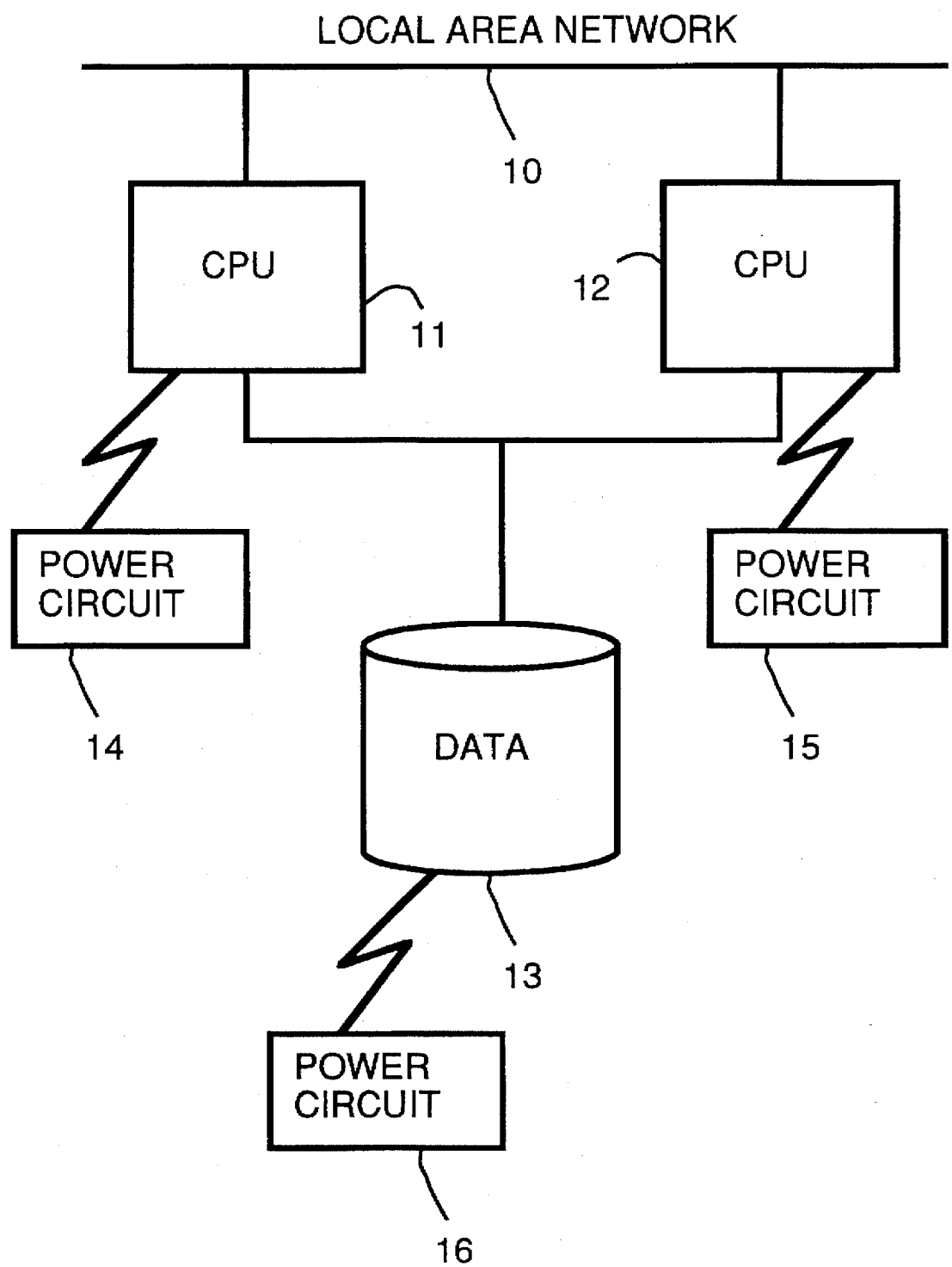
FIG. 1 shows a system configuration in which two central processing units (CPUs) are connected to external data storage which has a separate power circuit, in accordance with the prior art.

FIG. 1 shows a central processing unit (CPU) 11 connected to a CPU 12 through a local area network (LAN) 10. CPU 11 receives power from a power circuit 14. CPU 12 receives power from a power circuit 15. CPU 11 and CPU 12 both access common data storage 13. Data storage 13 has a separate power circuit 16.

In the event that communication between CPU 11 and CPU 12 over LAN 10 is broken, CPU 11 and CPU 12 need to determine which of them should control access to storage data 13. Communication between CPU 11 and CPU 12 over LAN 10 may broken, for example, because of a failure in LAN 10, a failure in CPU 11 or a failure in CPU 12. One of the most frequent causes of failure is, for example, a power failure to CPU 11 or CPU 12.

Once communication between CPU 11 and CPU 12 over LAN 10 is broken, CPU 11 and CPU 12 utilize a cluster quorum lock to determine which of them should control access to storage data 13. The cluster quorum lock is implemented, for example using a software implementation of an n-process mutual exclusion algorithm such as Dekker's algorithm or Lamport's algorithm. The winner of access to data storage 13 will utilize the data in data storage 13. The loser of access to data storage 13 will refrain from utilizing the data in data storage 13.

DESCRIPTION OF THE PREFERRED EMBODIMENT

Figure 2:
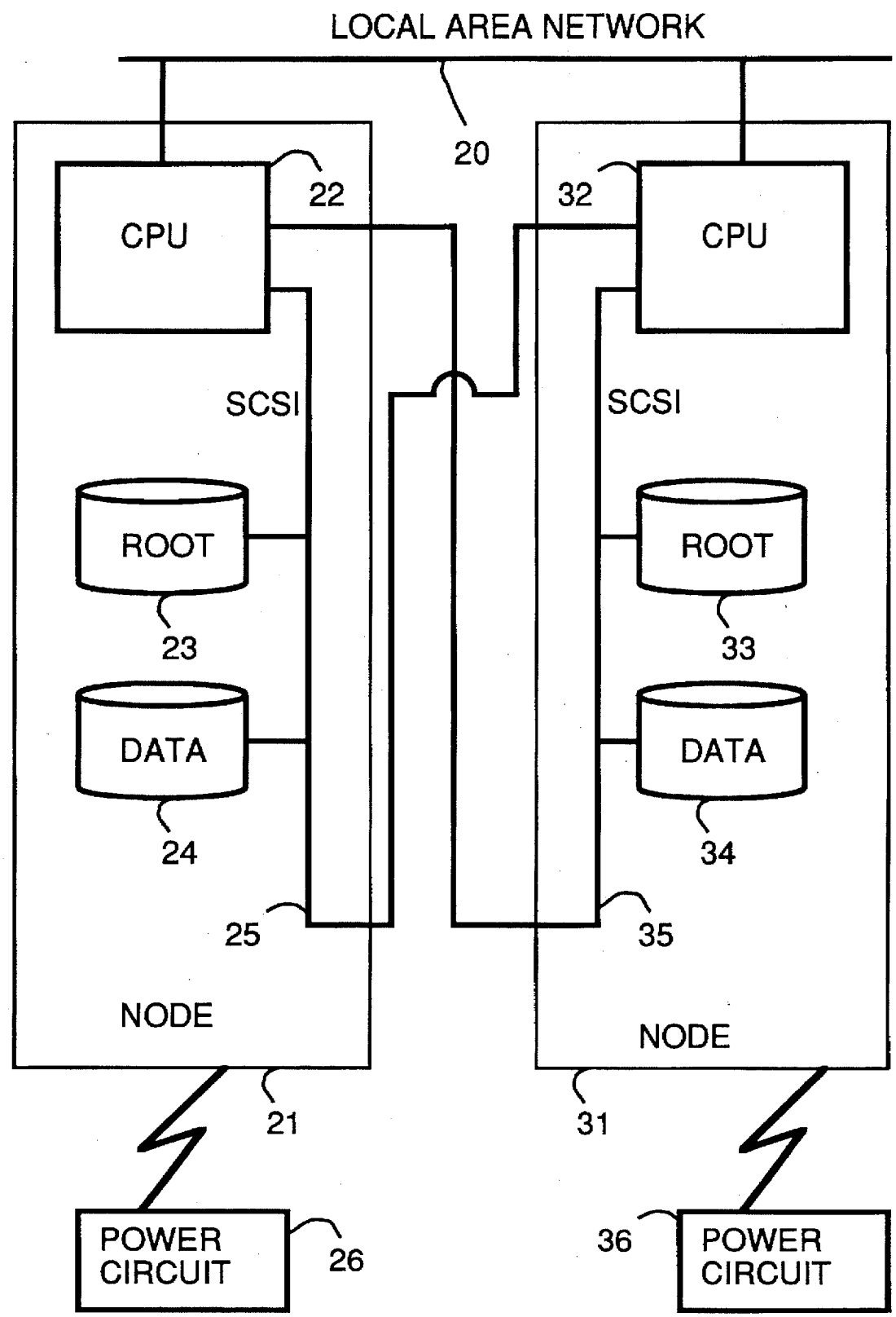
FIG. 2 shows a system configuration in which two nodes are interconnected, each node having a CPU and a data storage device, in accordance with the preferred embodiment of the present invention.

FIG. 2 shows a cluster system in accordance with the preferred embodiment of the present invention. The cluster system includes two subclusters. A first subcluster 21 includes a CPU 22, root data 23 and common data 24. Root data 23 is data utilized only by CPU 22. Root data 23 may be stored in a storage medium, such as a disk drive, shared with common data 24, or root data 23 may be stored in a storage medium separate from the storage medium used to store common data 24. CPU 22 access root data 23 and common data 24 using a network 25. For example, network 25 operates in accordance with the Small Computer Systems Interface (SCSI) protocol. Alternately, network 25 could operate in accordance with the Integrated Drive Electronics (IDE) protocol, or another protocol. Subcluster 21 is powered by a power circuit 26.

A second subcluster 31 includes a CPU 32, root data 33 and common data 34. Root data 33 is data utilized only by CPU 32. Root data 33 may be stored in a storage medium, such as a disk drive, shared with common data 34, or root data 33 may be stored in a storage medium separate from the storage medium used to store common data 34. CPU 32 access root data 33 and common data 34 using a network 35. For example, network 35 operates in accordance with the SCSI protocol. Alternately, network 35 could operate in accordance with the IDE protocol, or another protocol. Subcluster 31 is powered by a power circuit 36.

The two subcluster system shown in FIG. 2 is essentially a two node system. CPU 22 acts as the first node and CPU 32 acts as the second node.

CPU 22 and CPU 32 communicate using local area network (LAN) 20. For example LAN may operate in accordance with the ethernet protocol, the token ring protocol or some other protocol.

In order to allow for error recovery, a great amount of redundancy can be built into the cluster system shown in FIG. 2. For example, either CPU 22 or CPU 32, when operating alone, may provide all the processing power necessary to respond to users of the cluster system. Likewise, data 24 may be an exact copy of common data 34. Also, as shown in FIG. 2, CPU 22 is connected to network 35 and CPU 32 is connected to network 25. This allows CPU 22 full access to common data 34 and allows CPU 32 full access to data 24.

In the event that communication between CPU 22 and CPU 32 over LAN 20 is broken, CPU 22 and CPU 32 need to determine which of them should coordinate access to common data 24 and common data 34. The CPU which is not coordinator will not access common data 24 and common data 34 until communication over LAN 20 is re-established. Communication between CPU 22 and CPU 32 over LAN 20 may broken, for example, because of a failure in LAN 20, a failure in CPU 22, a failure in CPU 32. Failure in CPU 22 may be caused, for example by a power failure in power circuit 26. Likewise, failure in CPU 32 may be caused, for example by a power failure in power circuit 36.

Upon a failure in LAN 20, each of CPU 22 and CPU 32, if still operating, contend for the cluster quorum lock (CQL) for each of common data 24 and common data 34. CPU 22 and CPU 32 contend for each CQL in a fixed order. That is, both CPU 22 and CPU 32 will contend first for the CQL of common data 24 and second for the CQL of common data 34. Whenever CPU 22 and CPU 32 contend for a CQL, each CPU will get one of three responses. The first response is a "win", meaning that the CPU has won the CQL. The second response is a "loss", meaning that the other CPU won the CQL. The third response is "no response", meaning that there was a failure to communicate with the particular data storage device.

Each CQL is arbitrated, for example, using a software implementation of an n-process mutual exclusion algorithm such as Dekker's algorithm or Lamport's algorithm. See Harvey M. Deitel, *An Introduction to Operating Systems*, Revised First Edition, Addison-Wesley Publishing Company, Reading, Mass., 1984, pp. 86–87. When both CPUs successfully communicate with the storage device, one CPU will win the arbitration and one CPU will lose the arbitration. When only one CPU is able to contact the storage device, that CPU will win the arbitration for the CQL for that storage device.

Figure 3:
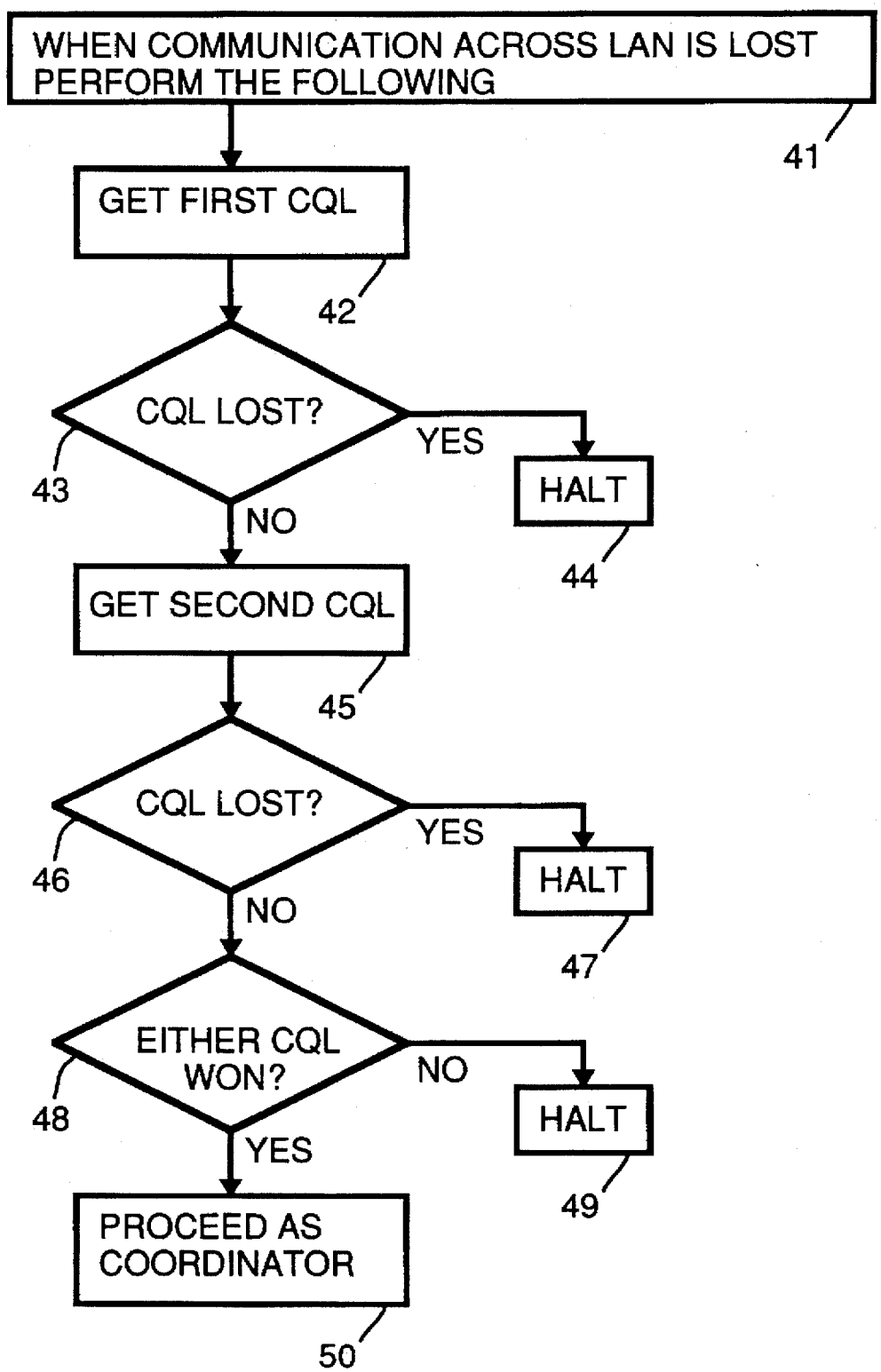
FIG. 3 shows a flowchart which shows the steps taken by processors in a cluster system upon communication loss in accordance with the preferred embodiment of the present invention.

Upon a failure in LAN 20, each of CPU 22 and CPU 32, if still operating, will proceed in accordance with the flowchart shown in FIG. 3. When, in a step 41, the CPU determines that communication across LAN 20 with the other CPU is lost, the CPU will, in a step 42, get the first CQL. CPU 22 and CPU 32 will both contend for CQLs in the same fixed order. For example, CPU 22 and CPU 32 will each first contend for the CQL for common data 24.

In a step 43, the CPU will determine whether it won the first CQL, lost the first CQL or if there was no response. If the CPU lost the CQL, in a step 44, the CPU will halt contention for the CQLs. The other CPU, proven to be alive by having won this CQL, will be the winner.

In the first CQL is not lost—that is the CPU either won the CQL or there was no response—in a step 45, the CPU will get the second CQL. As stated above, CPU 22 and CPU 32 will both contend for CQLs in the same fixed order. For example, CPU 22 and CPU 32 will each first contend for the CQL for common data 24 and will each second contend for the CQL for common data 34.

In a step 46, the CPU will determine whether it won the second CQL, lost the second CQL or if there was no response. If the CPU lost the CQL, in a step 47, the CPU will halt contention for the CQLs. The other CPU, proven to be alive by having won this CQL, will be the winner. In the second CQL is not lost—that is the CPU either won the CQL or there was no response—in a step 48, the CPU will determine whether it won either the first CQL or the second CQL. If the CPU did not win either the first CQL or the second CQL, then the CPU must have received no response for both the first CQL or the second CQL. In this case, in a step 49, the CPU will halt. That CPU will not be the winner because it failed to communicate with either common data 24 or common data 34.

If, in step 48, the CPU won either the first CQL or the second CQL, then the CPU, in a step 50, will proceed as cluster coordinator.

The above-described method is an efficient means for determining a cluster coordinator. For example, when the only failure in the system is LAN 20, then the CPU which wins the first CQL for common data 24, arbitrated in step 42, will eventually become the cluster coordinator.

When there is a failure of both LAN 20 and network 35, then the CPU which wins the first CQL for common data 24, arbitrated in step 42, will eventually become the cluster coordinator. When there is a failure of both LAN 20 and network 25, then the CPU which wins the second CQL for common data 34, arbitrated in step 45, will eventually become the cluster coordinator. If power circuit 26 fails, CPU 32 will become the cluster coordinator. If power circuit 36 fails, CPU 22 will become the cluster coordinator.

The above-described method for determining a cluster coordinator fails under two particular sets of circumstances. Specifically, failure occurs when communication across LAN 20 fails, the path between CPU 22 and common data 34 fails, the path between CPU 22 and common data 24 remains intact, the path between CPU 32 and common data 24 fails, and the path between CPU 32 and common data 34 remains intact. Additionally, the method fails when communication across LAN 20 fails, the path between CPU 22 and common data 24 fails, the path between CPU 22 and common data 34 remains intact, the path between CPU 32 and common data 34 fails, and the path between CPU 32 and common data 24 remains intact.

Each of these circumstances requires three simultaneous failures. Thus it is considered very unlikely to occur. However, to avoid such simultaneous failures, it is important to regularly utilize or at least check data links between subcluster 21 and subcluster 31 to avoid a broken link being undetected for a long period of time.

The use of the present invention is also useful in clusters with more than two nodes. For example, if a four node cluster is powered by only two power circuits, then the dual cluster quorum lock will be effective where the prior art single cluster quorum lock may not be successful. The four node cluster, when powered by only two power circuits, is configured such that each power circuit powers two processors and a storage device with a CQL. Thus, the loss of a single power circuit will always leave alive two nodes and a storage device with a CQL along with a path from the surviving two processors to the storage device.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. In a computing system having a first processor and a second processor communicating over a network, a method for attempting to select a coordinator when communication between the first processor and the second processor over the network fails, the method comprising the steps of:

(a) contending by the first processor and the second processor for a first cluster quorum lock of a first storage device;

(b) contending by at least one of the first processor and the second processor for a second cluster quorum lock of a second storage device; and, (c) selecting as the coordinator the first processor when the first processor wins at least one of the contendings in step (a) and step (b) and does not lose any of the contendings in step (a) and step (b).

2. A method as in claim 1 wherein in step (a) and step (b) the contendings are arbitrated using an n-process mutual exclusion algorithm.

3. A method as in claim 1 wherein when in step (a) the first processor is designated a loser of the first cluster quorum lock, the first processor does not contend for the second cluster quorum lock of the second storage device in step (b).

4. A method as in claim 1 wherein in step (a), as a result the first processor and the second processor contending for the first cluster quorum lock of the first storage device, each of the first processor and the second processor receives one of the following three responses:

win;

lose; and no response.

5. A method as in claim 1 wherein:

in step (a) the first processor and the second processor access the first storage device over a first Small Computer Systems Interface network; and, in step (b) at least one of the first processor and the second processor access the second storage device over a second Small Computer Systems Interface network.

6. A method as in claim 1 wherein the network is a local area network.

7. A method as in claim 1 additionally comprising the following step:

(d) selecting the second processor as the coordinator when the second processor wins at least one of the contendings in step (a) and step (b) and does not lose any of the contendings in step (a) and step (b).

8. A method by which a first processor determines whether the first processor is a coordinator of a cluster system after a failure in the computing system results in communication failure between the first processor and second processor, the method comprising the steps of:

(a) contending by the first processor for a first cluster quorum lock of a first storage device;

(b) contending by the first processor for a second cluster quorum lock of a second storage device; and, (c) determining that the first processor is the coordinator when the first processor wins one of the contendings in step (a) and step (b) and does not lose any of the contendings in step (a) and step (b).

9. A method as in claim 8 wherein in step (a) and step (b) the contendings are arbitrated using an n-process mutual exclusion algorithm.

10. A method as in claim 9 wherein when in step (a) the first processor is designated a loser of the first cluster quorum lock, the first processor does not contend for the second cluster quorum lock of the second storage device in step (b).

11. A method as in claim 8 wherein in step (a), as a result the first processor contending for the first cluster quorum lock of the first storage device the first processor receives one of the following three responses:

win;

lose; and no response.

12. A method as in claim 8 wherein:

in step (a) the first processor accesses the first storage device over a first Small Computer Systems Interface network; and, in step (b) the first processor accesses the second storage device over a second Small Computer Systems Interface network.

13. A method as in claim 8 wherein before the communication failure the first processor and the second processor communicate over a local area network.

14. A computing system comprising:

first data storage device having a first cluster quorum lock;

second data storage device having a second cluster quorum lock;

a first network;

a second network connected to the first data storage device;

a third network connected to the second data storage device;

a first processor, connected to the first network, the second network and the third network; and, a second processor, connected to the first network, the second network and the third network, the second processor including, first means for contending for the first cluster quorum lock when communication between the first processor and the second processor over the first network fails; and, second means for contending for the second cluster quorum lock when communication between the first processor and the second processor over the first network fails, and third means for determining that the second processor is a coordinator when either one of the following occurs:

the first means of the second processor wins contention for the first cluster quorum lock and the second means of the second processor does not lose contention for the second cluster quorum lock, and the second means of the second processor wins contention for the second cluster quorum lock and the first means of the second processor does not lose contention for the first cluster quorum lock.

15. A computing system as in claim 14 wherein the first cluster quorum lock and the second cluster quorum lock each operate in accordance with an n-process mutual exclusion algorithm.

16. A computing system as in claim 14 wherein:

a first power circuit powers the first processor and the first data storage device; and, a second power circuit powers the second processor and the second data storage device.

17. A computing system as in claim 14 wherein the second means does not contend for the second cluster quorum lock after the first means loses contention for the first cluster lock.

18. A computing system as in claim 14 wherein the first processor additionally includes:

first means for contending for the first cluster quorum lock when communication between the first processor and the second processor over the first network fails;

second means for contending for the second cluster quorum lock after the first means contends for the first cluster quorum lock; and third means for determining that the first processor is the coordinator when either one of the following occurs:

the first means of the first processor wins contention for the first cluster quorum lock and the second means of the first processor does not lose contention for the second cluster quorum lock; and, the second means of the first processor wins contention for the second cluster quorum lock and the first means of the first processor does not lose contention for the first cluster quorum lock.

* * * * *